United States Patent Office 3,019,194
Patented Jan. 30, 1962

3,019,194
CLEANING COMPOSITION AND METHOD
Alan D. Brite, 335 S. Bentley, Los Angeles, Calif.
No Drawing. Filed Feb. 18, 1957, Ser. No. 640,580
6 Claims. (Cl. 252—142)

This invention relates to cleaning compositions, and has particular reference to a composition and method for cleaning aluminum ware such as aluminum kitchen utensils and the like.

Aluminum kitchen ware, such as pots, pans and the like, has become highly popular and widely used, due primarily to its lightness in weight and excellent thermal conductivity. One of the principal disadvantages of aluminum kitchen ware is that it becomes discolored upon use in cooking. In fact, it is easily demonstrated, as is well known to those skilled in the art, that even upon boiling pure water in a new aluminum pot for a period of a few moments, the interior of the pot turns black in color, and this discoloration remains after repeated washings with soap or other detergents. A method for cleaning such discoloration has been proposed, wherein tartaric acid or the juice of a lemon is added to water and the water boiled in the pot to be cleaned. This method does, in fact, bring about fairly adequate removal of the discoloration, but is objectionable, and in fact even prohibitive, inasmuch as the pot is subject to corrosion or pitting, particularly along the water line. One of the principal objects of this invention is, therefore, to provide a cleaning composition and method for aluminum ware which overcomes this disadvantage.

Another object of this invention is to provide a cleaning composition for aluminum ware which is superior to prior art cleaners, yet which has no deleterious effect upon the aluminum ware itself and which is non-irritating to the skin of the user.

Another object of this invention is to provide a cleaning composition for aluminum ware which is highly effective and easy to use, yet which is very inexpensive and thus readily available for day-to-day use by the housewife.

Other objects and advantages of this invention will be readily understood from the following detailed description of preferred embodiments thereof.

Briefly, this invention includes the discovery that aqueous solutions of ammonium bifluoride ($NH_4HF_2$) and a water soluble aliphatic hydroxy carboxylic acid, particularly glycolic acid, comprise highly efficacious cleaning compositions for aluminum ware. Especially important is the fact that these compositions are eminently suitable as household cleaners in that they are non-irritating to the skin.

The following specific example represents a preferred composition, but it is not intended to limit the invention thereto:

|  | Percent (by weight) |
|---|---|
| Ammonium bifluoride | 3.5 |
| Glycolic acid (75% solution) | 20 |
| Water | 76.5 |

Preferably, although not essentially, a small amount (i.e., of the order of 0.5%) of a wetting agent, such as "Victowet" No. 12, manufactured by the Victor Chemical Co., is added. Ammonium fluoride ($NH_4F$) may be substituted for the ammonium bifluoride, but at some sacrifice in cleaning properties and considerable loss in the non-irritating property. As indicated, other water soluble aliphatic hydroxy carboxylic acids, such as citric acid, tartaric acid, gluconic acid and the like, may be used, but the glycolic acid is far superior to such other acids.

The relative proportions of the fluorine salt and the acid may be varied, preferably within the ranges of 1-20 percent for the salt and 5-50 percent for the acid.

In use of the composition of this invention, a small amount of the solution is daubed or otherwise applied to the surface to be cleaned, left thereon for a minute or so and then rinsed off, leaving the aluminum surface clean and bright.

Having fully described my invention, it is to be understood that I do not wish to be limited to the details set forth, but my invention is of the full scope of the appended claims.

I claim:

1. A cleaning composition for aluminum ware comprising an aqueous solution of from 1-20 percent of a fluoride salt selected from the group consisting of ammonium bifluoride and ammonium fluoride, and from 5-50 percent of glycolic acid.

2. A cleaning composition for aluminum ware comprising an aqueous solution of from 1-20 percent of ammonium bifluoride, and from 5-50 percent of glycolic acid.

3. A cleaning composition for aluminum ware comprising an aqueous solution of 3.5 percent of ammonium bifluoride, and 15 percent of glycolic acid.

4. A process for cleaning surfaces of aluminum ware comprising the step of subjecting the surfaces to the action of an aqueous solution of from 1-20 percent of a fluoride salt selected from the group consisting of ammonium bifluoride and ammonium fluoride, and from 5-50 percent of glycolic acid.

5. A process for cleaning surfaces of aluminum ware comprising the step of subjecting the surfaces to the action of an aqueous solution of from 1-20 percent of ammonium bifluoride, and from 5-50 percent of glycolic acid.

6. A process for cleaning surfaces of aluminum ware comprising the step of subjecting the surfaces to the action of an aqueous solution of 3.5 percent of ammonium bifluoride, and 15 percent of glycolic acid.

References Cited in the file of this patent

UNITED STATES PATENTS

| 1,890,214 | Churchill | Dec. 6, 1932 |
| 2,270,712 | Wood | Jan. 20, 1942 |
| 2,318,559 | Percival | May 4, 1943 |
| 2,344,404 | Giloy | Mar. 14, 1944 |
| 2,383,800 | Johnson | Aug. 28, 1945 |
| 2,607,722 | Kreml | Aug. 19, 1952 |
| 2,653,861 | Meyer | Sept. 29, 1953 |
| 2,687,346 | McDonald | Aug. 24, 1954 |
| 2,711,364 | Beach | June 21, 1955 |
| 2,711,389 | Beach | June 21, 1955 |
| 2,714,094 | McNally | July 26, 1955 |
| 2,719,781 | Hesch | Oct. 4, 1955 |

FOREIGN PATENTS

| 1,059,574 | France | Nov. 10, 1953 |